United States Patent
Yamada (10) Patent No.: US 8,941,851 B2
(45) Date of Patent: Jan. 27, 2015

(54) IMAGE FORMING APPARATUS CONFIGURED SO THAT AN ATTACHABLE AND DETACHABLE STORAGE MEDIUM IS ATTACHABLE THERETO

(71) Applicant: Kyocera Document Solutions Inc., Osaka (JP)

(72) Inventor: Youhei Yamada, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/870,555

(22) Filed: Apr. 25, 2013

(65) Prior Publication Data

US 2013/0286421 A1   Oct. 31, 2013

(30) Foreign Application Priority Data

Apr. 27, 2012 (JP) ................... 2012-102560

(51) Int. Cl.
*G06F 3/12* (2006.01)
*G06K 15/00* (2006.01)
*H04N 1/00* (2006.01)

(52) U.S. Cl.
CPC .................. *H04N 1/00795* (2013.01)
USPC .......... 358/1.13; 358/1.1; 358/1.15; 358/1.16

(58) Field of Classification Search
USPC ........ 358/1.13, 1.1, 1.6, 1.15, 1.16, 474, 497, 358/498, 410, 444; 709/229, 219, 203, 227, 709/230; 710/1, 2, 5, 15, 20, 68, 72, 100, 710/301, 313
See application file for complete search history.

(56) References Cited

U.S. PATENT DOCUMENTS

| | | | |
|---|---|---|---|
| 2007/0156705 A1* | 7/2007 | Tsuya | 707/10 |
| 2010/0188713 A1* | 7/2010 | Ogura et al. | 358/474 |
| 2010/0245915 A1* | 9/2010 | Ishigure | 358/1.16 |
| 2011/0069353 A1* | 3/2011 | Sawayanagi et al. | 358/1.16 |

FOREIGN PATENT DOCUMENTS

| | | |
|---|---|---|
| JP | 2006-107376 | 4/2006 |
| JP | 2011-160263 | 8/2011 |

OTHER PUBLICATIONS

Tanaka, Image Processor, Aug. 18, 2011, Translation of Japaneses Patent, JP2011160263, all pages.*
Tanaka, Image Processor, Aug. 18, 2011, Translation of Japaneses Patent Publication, JP2011160263, all pages.*

* cited by examiner

*Primary Examiner* — Ngon Nguyen
(74) *Attorney, Agent, or Firm* — K&L Gates LLP (57) ABSTRACT

An image forming apparatus is configured so that an attachable and detachable storage medium is attachable thereto, and the image forming apparatus includes an operation unit, a document reading unit, and a control unit. The operation unit receives an operation due to a user. The document reading unit reads a document and generates the image data of the document. The control unit controls the document reading unit to start an operation for reading a document after having received an instruction for reading a document, from the user through the operation unit, and after identification information of the document and a destination to save the image data of that document have been saved in the attached storage medium, when the storage medium is not detached during the operation for reading the document, the control unit stops the operation for reading the document.

10 Claims, 5 Drawing Sheets

| DOCUMENT ID | DESTINATION TO SAVE IMAGE DATA | DOWNLOADING APPLICATION |

IMAGE FORMING APPARATUS CONFIGURED SO THAT AN ATTACHABLE AND DETACHABLE STORAGE MEDIUM IS ATTACHABLE THERETO

INCORPORATION BY REFERENCE

This application is based upon and claims the benefit of priority from the corresponding Japanese Patent Application No. 2012-102560, filed in the Japan Patent Office on Apr. 27, 2012, the entire contents of which are incorporated herein by reference.

BACKGROUND

The present disclosure is related to an image forming apparatus such as a copying machine or a multifunction machine.

In recent years in image forming apparatuses, such as a copying machine and a multifunction machine, it is known to provide an apparatus capable of transmitting and receiving various kinds of data to and from an attachable and detachable storage medium such as a universal serial bus (USB) memory or a secure digital (SD) card. In such an image forming apparatus, it is possible to print out an electronic file stored in a storage medium, such as an image file or a document file, and it is possible to save, in a storage medium, an image file such as a document image, read owing to a scanning function included in the image forming apparatus.

In this type of image forming apparatus, when document image data obtained by scanning a document serving as a reading target has been saved in the storage medium, it has been difficult to detach the storage medium until scanning has been terminated and all document image data has been saved in the storage medium. It is necessary to make sure to collect the document and the storage medium after the scanning has been terminated. However, scanning of a document such as a printed book, whose quantity is great, has been generalized owing to the rise of electronic book readers in recent years. In addition to this, for example, the difference between the presences of a large amount of a document and a small storage medium has occurred owing to the downsizing of a storage medium (for example, owing to the commercialization of a USB memory where a projecting portion from a connector is 5 mm). Therefore, there is now a greater concern of leaving behind the storage medium than before.

SUMMARY

An image forming apparatus according to an embodiment of the present disclosure is configured so that an attachable and detachable storage medium is attachable thereto, and the image forming apparatus includes an operation unit, a document reading unit, and a control unit. The operation unit receives an operation from a user. The document reading unit reads a document and generates the image data of the document. The control unit controls the document reading unit to start an operation for reading a document, after having received the instruction to read a document, from the user through the operation unit, and after identification information of the document and a destination to save the image data of that document have been saved in the attached storage medium, when the storage medium is not detached during the operation for reading the document, the control unit stops the operation for reading the document.

Additional features and advantages are described herein, and will be apparent from the following Detailed Description and the figures.

DETAILED DESCRIPTION

Hereinafter, an embodiment of the present disclosure will be described with reference to drawings. In addition, hereinafter, as an image forming apparatus according to an embodiment of the present disclosure, a multifunction machine based on an electrophotographic method will be exemplified and described that combines the functions of a copying machine, a printer, a facsimile machine, and the like.

Figure 1:
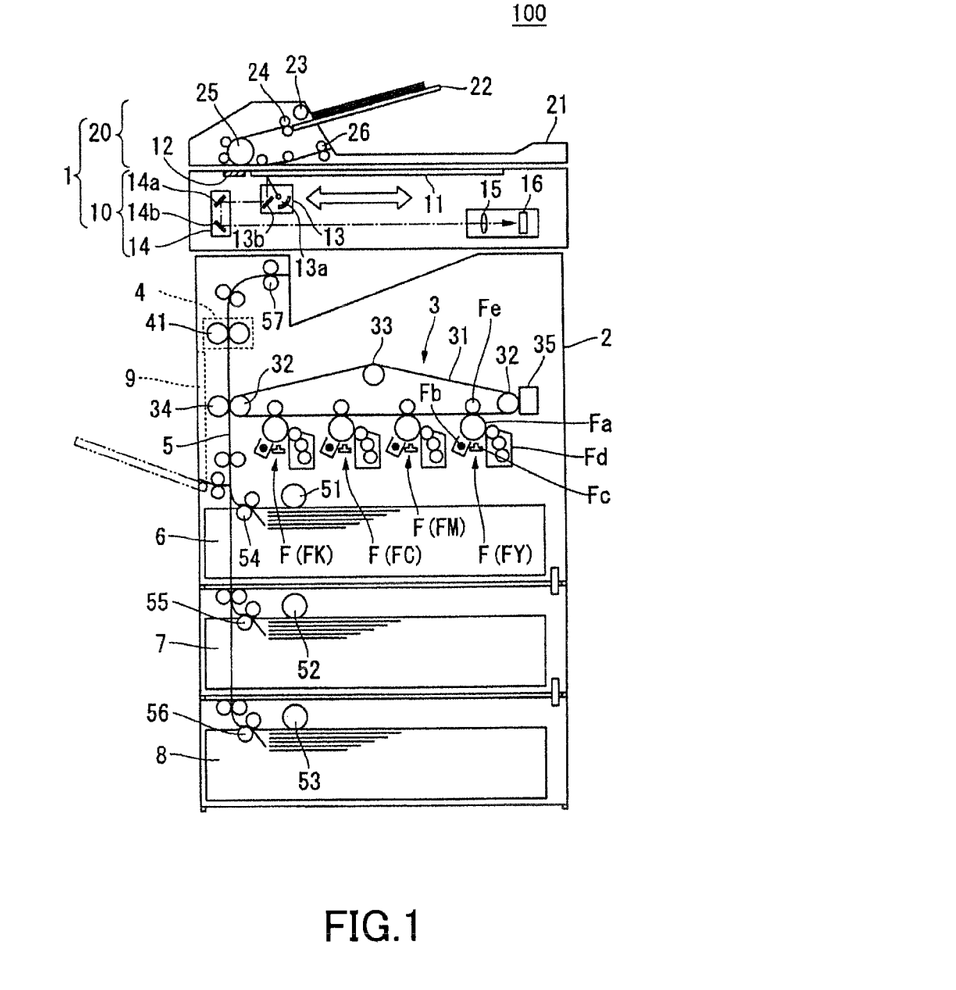
FIG. 1 is a front perspective view illustrating a main portion configuration of a multifunction machine according to an embodiment.

FIG. 1 is a front perspective view illustrating the main portion configuration of a multifunction machine 100 according to an embodiment. As illustrated in FIG. 1, the multifunction machine 100 includes a document reading unit 1 for reading a document and generating the image data of the document (hereinafter, referred to as document image data) and a main body portion 2 forming an image on a printing paper based on the document image data obtained from the document reading unit 1 or image data received from an external device such as a facsimile machine or a personal computer through a communication line (hereinafter, referred to as received image data).

The document reading unit 1 is configured due to a scanner 10 and an automatic document feeder (Auto Document Feeder: ADF) 20. The scanner 10 reads a document set on a platen glass 11 or a document automatically fed by the ADF 20, and includes the platen glass 11, a white reference plate 12, a full rate carriage 13, a half rate carriage 14, a condensing lens 15, and a charge coupled devices (CCD) sensor 16.

The platen glass 11 is a glass plate used for setting, one at a time, sheets that serve as a reading target. The white reference plate 12 is a white plate used for acquiring white reference data used for shading correction. Below the platen glass 11, the full rate carriage 13 is provided that is capable of reciprocating in a left-right direction (scanning direction) along the platen glass 11 due to a carriage transport mechanism not illustrated. In addition, the full rate carriage 13 includes a lamp 13a that causes illumination light to exit obliquely upward and a mirror 13b reflecting the reflected light of the illumination light toward the half rate carriage 14 described later.

In the same way as the full rate carriage 13, the half rate carriage 14 is provided so as to be capable of reciprocating in a left-right direction along the platen glass 11 due to a carriage transport mechanism not illustrated. The half rate carriage 14 includes a mirror 14a reflecting incident light from the mirror 13b in the full rate carriage 13 downward and a mirror 14b reflecting incident light from the mirror 14a toward the condensing lens 15 described later. In addition, due to the carriage transport mechanisms, the ratio between the displacement amount of the full rate carriage 13 and the displacement amount of the half rate carriage 14 is controlled so as to be 1:0.5. Accordingly, the optical path length of the illumination light reaching the CCD sensor 16 becomes constant.

When the document set on the platen glass 11 is read, the full rate carriage 13 and the half rate carriage 14 are displaced in the scanning direction, and hence, the document is scanned. On the other hand, when the document is automatically fed by the ADF 20 described later, the full rate carriage 13 and the half rate carriage 14 are caused to wait at predetermined positions for reading a document, and a plurality of sheets in the document, which have been set, are sequentially scanned by displacing (transporting) a document side.

The condensing lens 15 condenses incident light from the mirror 14b in the half rate carriage 14, causing an image to be formed in the light-receiving surface of the CCD sensor 16. The CCD sensor 16 operates in synchronization with a timing signal supplied from a CCD driving unit not illustrated, generates an analog voltage signal according to the imaged of the read document by subjecting light received in the light-receiving surface to photoelectric conversion, and outputs the analog voltage signal to an analog front end (AFE: not illustrated). In addition, by digital-converting the above-mentioned analog voltage signal after amplifying the analog voltage signal with a predetermined gain setting value, the AFE generates document image data representing the image of the read document, and outputs this document image data to an after-mentioned control unit 60 in the main body portion 2.

The ADF 20 sequentially and automatically feeds, one at a time, a plurality of sheets in a document setting tray 22, and includes a platen cover 21, the document setting tray 22, a pickup roller 23, a resist roller 24, a platen roller 25, a paper ejection roller 26, and the like. The platen cover 21 is provided so as to be openable and closable with respect to the upper surface of the scanner 10, and functions as a document holding cover when a document is placed on the platen glass 11 and read, and a chassis used for housing members used in an automatic paper feeding mechanism, such as the pickup roller 23, the resist roller 24, the platen roller 25, and the paper ejection roller 26. In addition, in FIG. 1, the platen cover 21 is illustrated as closed.

The document setting tray 22 is used for positioning a document serving as a reading target. The pickup roller 23 is a roller used for picking up, one at a time, a number of sheets in the document setting tray 22 and feeds the document to the resist roller 24. The resist roller 24 is used for feeding a document to the platen roller 25 with predetermined timing. The platen roller 25 is used for feeding a document to the paper ejection roller 26 through a predetermined position for reading a document. The paper ejection roller 26 is used for ejecting a document after the completion of reading. The rotational operations of these individual rollers are controlled by the control unit 60 in the main body portion 2.

When the document image data obtained from the document reading unit 1, or the received image data received from the external device through the communication line, is RGB color space data, the main body portion 2 functions to convert these pieces of image data into image data for printing, which serves as CMYK color space data (the after-mentioned function of the control unit 60). The RGB color space data is digital data indicating the gradation values of pixels (minimum units configuring an image) corresponding to the individual colors of red (R), green (G), and blue (B) serving as light's three primary colors.

In addition, the CMYK color space data is data representing an image by adding K (key plate: a black color material) to the three primary colors of color materials for printing (toners in the multifunction machine 100), which serve as cyan (C), magenta (M), and yellow (Y). In the multifunction machine 100 based on an electrophotographic method, toner images developed in a photoreceptor surface with respect to the individual colors of CMYK are superimposed, and one toner image is formed.

In addition, the main body portion 2 includes a toner image forming unit 3 forming, on a printing paper, a toner image based on the above-mentioned image data for printing, a fixing unit 4 fixing the toner image on the printing paper and completing an image, a paper transport mechanism 5 for feeding the printing paper, and paper feeding cassettes 6, 7, and 8 used for housing printing papers having various kinds of sizes. Furthermore, in the main body portion 2, a manual-bypass tray 9 is provided that is openable and closable on a near side, and a configuration is adopted where it is possible to feed printing papers set on the manual-bypass tray 9, due to the paper transport mechanism 5.

The toner image forming unit 3 includes an intermediate transfer belt 31, toner image forming units F (FY, FM, FC, and FK) individually corresponding to the individual colors of CMYK, a driving roller 32, a tension roller 33, a secondary transfer roller 34, and a cleaner 35. The intermediate transfer belt 31 is used for sequentially superimposing and primarily transferring the toner images of the individual colors formed (developed) by the individual toner image forming units F (FY, FM, FC, and FK), and extends between the driving roller 32 and the tension roller 33 and travels in a circulating manner in a clockwise manner in FIG. 1.

Each of the toner image forming units F (FY, FM, FC, and FK) includes a photoreceptor drum Fa, a charging unit Fb, an exposure unit Fc, a developing unit Fd, and a primary transfer roller Fe, and further includes a cleaning device, a neutralization device, and the like, not illustrated. The photoreceptor drum Fa has a circular cylindrical shape, and in the circumferential surface thereof, an electrostatic latent image and a toner image based on the electrostatic latent image are formed. The charging unit Fb is positioned so as to face the photoreceptor drum Fa, and changes the circumferential surface of the photoreceptor drum Fa.

The exposure unit Fc causes laser light to scan the circumferential surface of the photoreceptor drum Fa in the charged state, and forms an electrostatic latent image. In detail, the exposure unit Fc irradiates positions on the photoreceptor drum Fa with laser light, the positions corresponding to dot positions at which toner is to be located. By causing toner to adhere to the circumferential surface of the photoreceptor drum Fa, the developing unit Fd develops a toner image based on the electrostatic latent image, on the circumferential surface of the photoreceptor drum Fa.

The primary transfer roller Fe is positioned so as to face the photoreceptor drum Fa across the intermediate transfer belt 31, and primarily transfers the toner image developed in the photoreceptor drum Fa, to the intermediate transfer belt 31. The secondary transfer roller 34 is positioned so as to face the driving roller 32 across the intermediate transfer belt 31, and secondarily transfers the toner image (obtained by superimposing the toner images of the individual colors), transferred to the surface of the intermediate transfer belt 31, to a printing paper fed by the paper transport mechanism 5 from one of the paper feeding cassettes 6, 7, and 8. The cleaner 35 includes a cleaning roller, a cleaning blade, and the like, and removes the residual toner of the intermediate transfer belt 31.

The fixing unit 4 fixes the toner image secondarily transferred on the printing paper, and completes the image. The fixing unit 4 includes a heating roller 41 fixing the toner image by applying pressure and heating. In addition, the heat generating temperature (namely, the fixing temperature of the fixing unit 4) of this heating roller 41 becomes controllable due to the after-mentioned control unit 60.

The paper transport mechanism 5 includes pickup rollers 51, 52, and 53 used for feeding printing papers one at a time from paper feeding cassettes 6, 7, and 8, paper feeding rollers 54, 55, and 56 for feeding the picked up printing papers to the toner image forming unit 3 (a nip portion between the driving roller 32 and the secondary transfer roller 34), a paper ejection roller 57 for ejecting, to the outside, a printing paper after the fixing processing due to the fixing unit 4, and the like. The paper feeding cassettes 6, 7, and 8 are attached so as to be drawable with respect to the main body portion 2, and house papers having various kinds of sizes.

Figure 2:
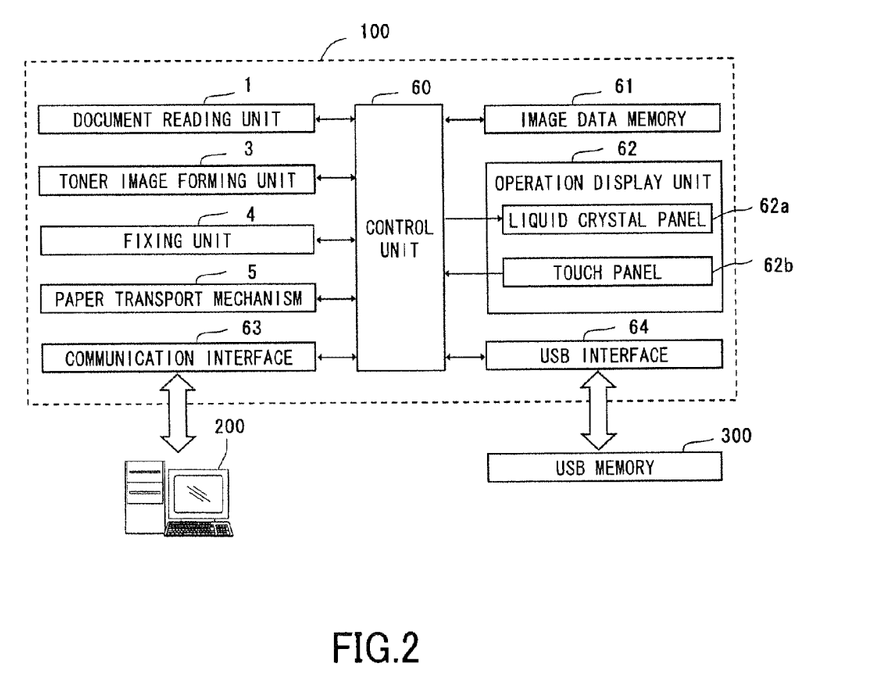
FIG. 2 is a functional block diagram of the multifunction machine.

FIG. 2 is the functional block diagram of the multifunction machine 100. In FIG. 2, the same symbol will be assigned to the same configuration element as in FIG. 1 and the description thereof will be omitted. In FIG. 2, a symbol 60 is a control unit, a symbol 61 is an image data memory, a symbol 62 is an operation display unit, a symbol 63 is a communication interface, and a symbol 64 is a USB interface. In addition, a symbol 200 is an external device connected to the multifunction machine 100 so as to be capable of communicating therewith. In addition, a symbol 300 is a USB memory attached to the multifunction machine 100, as an attachable and detachable storage medium.

The control unit 60 is a microcomputer into which, for example, a central processing unit (CPU) core, a memory such a read only memory (ROM) or a random access memory (RAM), an input-output interface, and the like are integrally incorporated. In addition, based on an operation signal input from the operation display unit 62, the document image data obtained from the document reading unit 1, and the received image data received from the external device 200 through the communication interface 63, the control unit 60 controls the entire operation of the multifunction machine 100 (the operation for reading a document, performed by the document reading unit 1, the operation for forming a toner image, performed by the toner image forming unit 3, the fixing operation due to the fixing unit 4, the paper feeding operation due to the paper transport mechanism 5, and so forth).

In addition, as described above, when the document image data obtained from the document reading unit 1 or the received image data received from the external device 200 through the communication line is the RGB color space data, control unit 60 also converts these pieces of image data into pieces of image data for printing, which serve as pieces of the CMYK color space data.

The image data memory 61 is, for example, a rewritable non-volatile memory such as a flash memory, and stores, under control of the control unit 60, pieces of image data such as the document image data obtained from the image reading unit 1, the received image data received from the external device 200, and the above-mentioned image data for printing.

The operation display unit 62 includes, for example, a liquid crystal panel 62a that functions as a display unit displaying a screen (image) used for notifying a user of various kinds of information, and a touch panel 62b functioning as an operation unit used for receiving an operation due to the user. Under control of the control unit 60, the liquid crystal panel 62a displays a screen used for notifying the user of various kinds of operation keys (soft keys) and various kinds of information. The touch panel 62b is superimposed on the above-mentioned liquid crystal panel 62a, and outputs, to the control unit 60, an operation signal corresponding to the operation of the user, performed on various kinds of operation keys displayed in the liquid crystal panel 62a.

The communication interface 63 is used for establishing communication between the multifunction machine 100 (in detail, the control unit 60) and the external device 200, and connected to the external device 200 so as to be capable of communicating therewith due to a network such as a local area network (LAN). The USB interface 64 is an interface compliant with a USB standard, and electrically connected to the USB memory 300 by the USB memory 300 being attached thereto.

When connected to the USB memory 300, the USB interface 64 transmits and receives various kinds of data to and from the USB memory 300 due to the control unit 60. In addition, it is possible for the USB interface 64 to detect whether or not the USB memory 300 has been attached and whether or not the USB memory 300 has been detached, and the USB interface 64 outputs the detection result to the control unit 60.

Next, the operation of the multifunction machine 100 configured in such a way as described above will be described.

The control unit 60 in an embodiment functions (a function for preventing a USB memory from being left behind), as the characteristic function thereof. In addition, in a case where, based on the operation signal inputted from the operation display unit 62, it has been detected that an instruction for reading a document has been received from the user, specifically in a case where it has been detected that a scanning start key (not illustrated) has been held down in a state in which the USB memory 300 has been attached to the USB interface 64, the control unit 60 controls the document reading unit 1 to start the operation for reading a document. After at least identification information of a document serving as a reading target and a destination to save the image data (document image data) of the document have been saved in the attached USB memory 300, the control unit 60 stops the operation for reading a document when the USB memory 300 is not detached during the operation for reading a document.

Hereinafter, with reference to FIG. 3 to FIG. 6, processing will be described that is executed by the control unit 60 so as to achieve the above-mentioned function for preventing a USB memory from being left behind.

Figure 3:
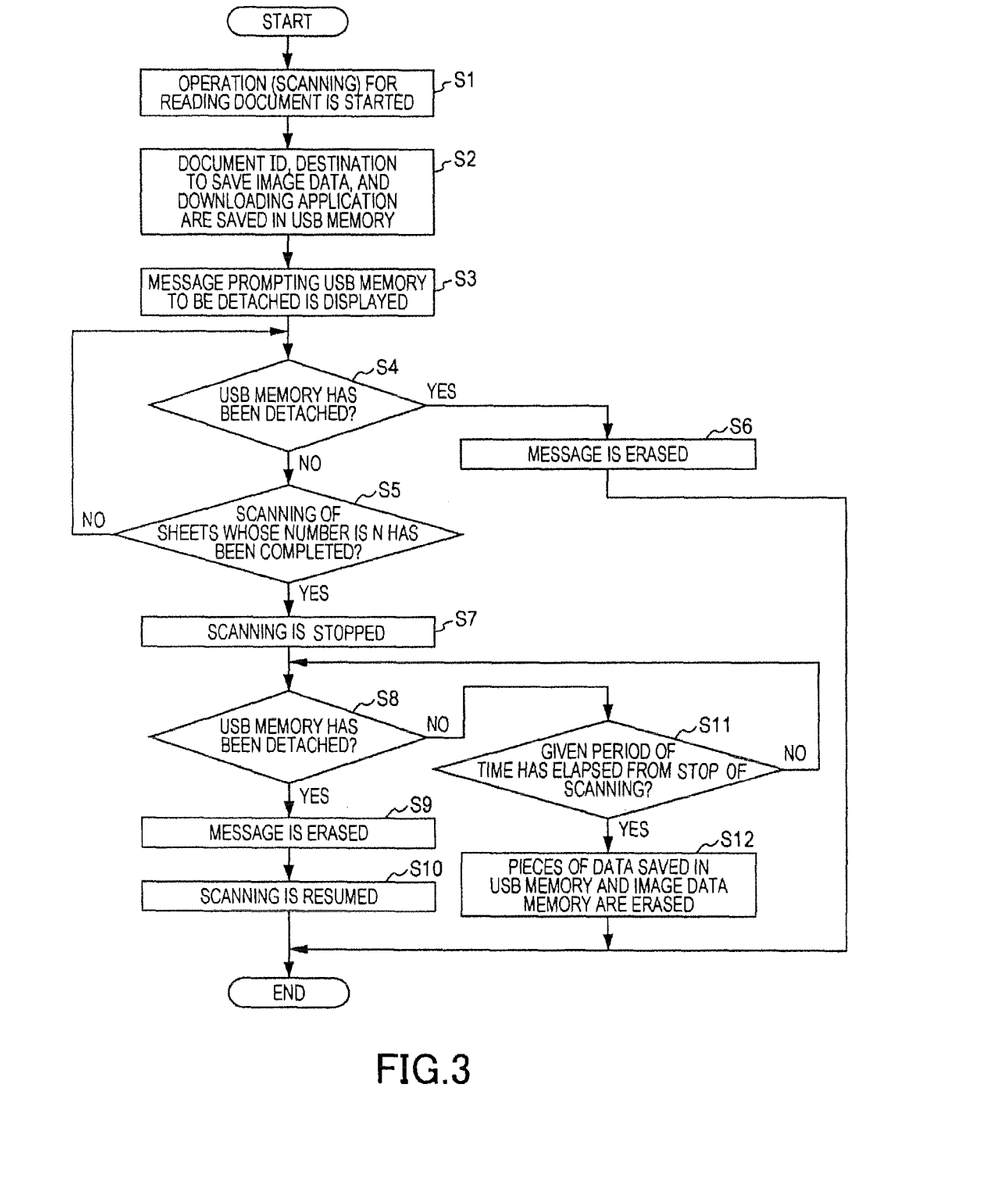
FIG. 3 is a flowchart illustrating processing a control unit in the multifunction machine executes so as to achieve a function for preventing a USB memory from being left behind.

FIG. 3 is a flowchart illustrating the processing the control unit 60 executes so as to realize the function for preventing a USB memory from being left behind. After detecting that the scanning start key has been held down in a state where the USB memory 300 has been attached to the USB interface 64, the control unit 60 starts the processing illustrated in FIG. 3. In addition, hereinafter, a case will be assumed where the scanning start key is held down after a plurality of sheets in a document have been set in the document setting tray 22 in the ADF 20 by the user.

As illustrated in FIG. 3, after having detected that the scanning start key has been held down in a state where the USB memory 300 has been attached to the USB interface 64, the control unit 60 controls the document reading unit 1 to start an operation (scanning) for reading a document (step S1). Accordingly, the document reading unit 1 sequentially reads, one at a time, the plural sheets in the document set in the document setting tray 22, and sequentially generates and outputs, to the control unit 60, document image data based on an RGB color space format, which represents the image of the read document. The control unit 60 sequentially saves, in the image data memory 61, the document image data obtained from the document reading unit 1 with respect to each document.

In parallel with the control of the operation for reading the document, performed by the document reading unit 1, and the control of the saving operation for the document image data, performed by the image data memory 61, which are described above, the control unit 60 saves, in the USB memory 300, the identification information (document ID) of the document serving as a reading target, a destination to save the document image data of the document (a destination to save image data), and application software (downloading application) automatically downloading the document image data associated with the document ID from the destination to save image data, when the application software has been executed (step S2).

Figure 4:
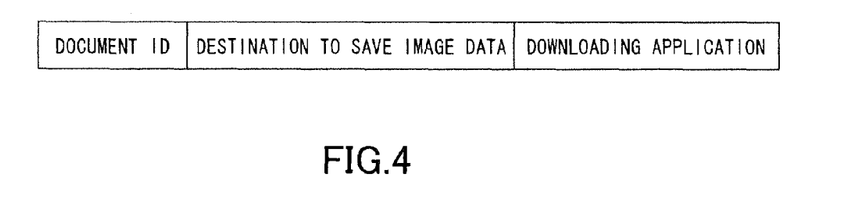
FIG. 4 is a diagram illustrating pieces of data (a document ID, a destination to save image data, and a downloading application) the control unit saves in a USB memory.

FIG. 4 is a diagram illustrating pieces of data (a document ID, a destination to save image data, and a downloading application) the control unit 60 saves in the USB memory 300. Here, the document ID is only one identification number assigned to a plurality of sheets in a document set in the document setting tray 22. From the viewpoint of security, it is desirable that the document ID is set to, for example, the unique serial number of the USB memory 300, the value of a random number, or the like. Eventually, the control unit 60 saves, in the image data memory 61, the document image data of the entire read document associating the document image data with the document ID.

When the document image data is saved in the image data memory 61 serving as a storage device within the multifunction machine 100 as in an embodiment, the destination to save image data is an address on a network, assigned to the multifunction machine 100. On the other hand, when the document image data is saved outside of the multifunction machine 100, for example, on an external storage device such as a server accessible due to network communication, an address on a network, assigned to the external storage device, becomes the destination to save image data.

The downloading application is software executable on an operation system (OS) installed onto a general-purpose computer such as a personal computer used by the user, and as described above, the downloading application causes the personal computer to automatically download the document image data, associated with the document ID, from the destination to save image data when the user has executed the downloading application on the personal computer.

Figure 5:
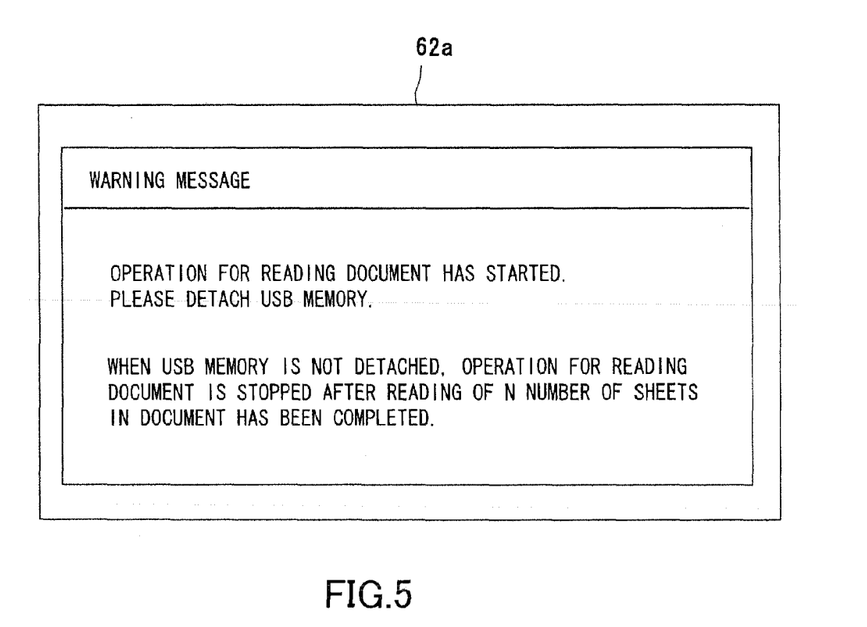
FIG. 5 is an example of a message prompting the USB memory to be detached, the message being caused by the control unit to be displayed in a liquid crystal panel in an operation display unit.

After, in such a way as described above, having saved the document ID, the destination to save image data, and the downloading application in the attached USB memory 300, the control unit 60 causes the liquid crystal panel 62a in the operation display unit 62 to display a message such as illustrated in FIG. 5, which prompts the USB memory 300 to be detached, until the USB memory 300 is detached (step S3).

In addition, by referring to a detection result outputted from the USB interface 64, the control unit 60 determines whether or not the USB memory 300 has been detached from the USB interface 64 (step S4). In the case of "Yes" in this step S4, namely, when the memory 300 has been detached, the control unit 60 causes the message to be erased, the message being displayed in the liquid crystal panel 62a and prompting the USB memory 300 to be detached (step S6).

In this way, after "Yes" has been determined in the step S4 and the message prompting the USB memory 300 to be detached has been erased, the operation for reading the document, performed by the document reading unit 1, is continued until the document image data of the document of a final page is obtained. When the document image data of the entire document finally read has been saved in the image data memory 61 with being associated with the document ID, the processing illustrated in FIG. 3 is terminated.

On the other hand, in the case of "No" in the above-mentioned step S4, namely, when the USB memory 300 is not detached, the control unit 60 determines whether or not reading of a number of sheets in the document has been completed, the number of sheets in the document having been preliminarily defined as N (for example, N=5) (step S5). While, in the case of "No" in the step S5, returning to the processing in the step S4, the control unit 60 controls the document reading unit 1 to stop the operation for reading the document, in the case of "Yes" (step S7).

Figure 6:
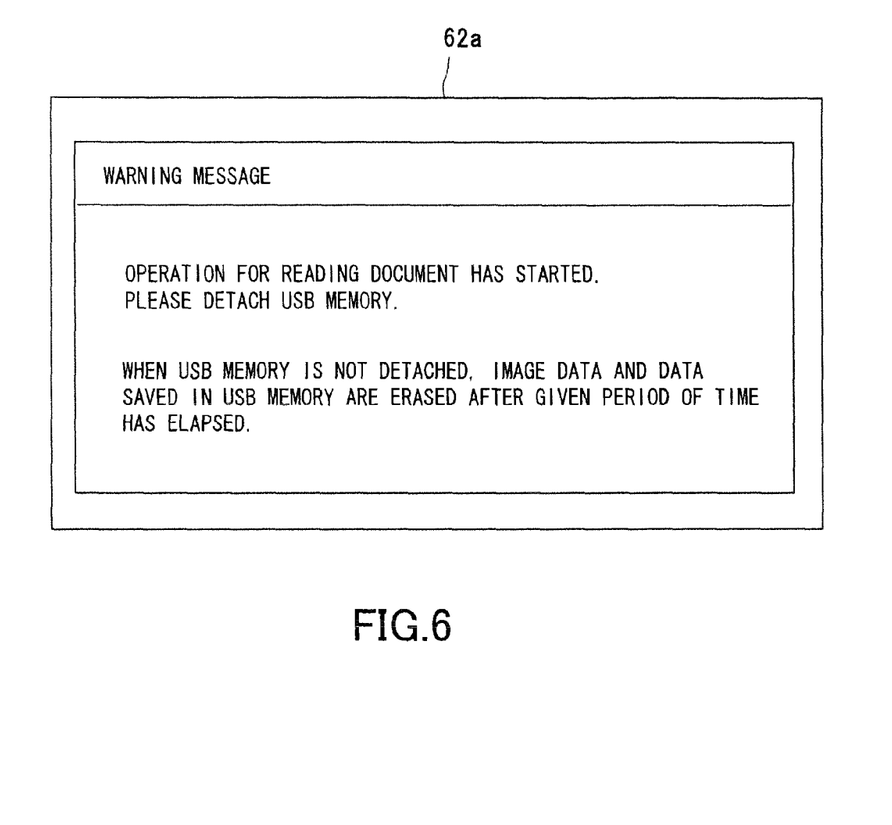
FIG. 6 is an example of a message that more strongly prompting the USB memory to be detached, the message being caused to be displayed in the liquid crystal panel after the control unit has stopped an operation for reading a document.

In other words, when reading of the preliminarily defined number of sheets in the document has been completed without the USB memory 300 being detached, the control unit 60 stops the operation for reading the document. In addition, after the operation for reading the document has been stopped, the control unit 60 may also cause the liquid crystal panel 62a in the operation display unit 62 to display a message more strongly prompting the USB memory 300 to be detached.

In addition, after, in such a way as described above, having stopped the operation for reading the document, by referring to a detection result output from the USB interface 64 the control unit 60 determines whether or not the USB memory 300 has been detached from the USB interface 64 (step S8). In the case of "Yes" in this step S8, namely, when the USB memory 300 has been detached, the control unit 60 causes the message to be erased, the message being displayed by the liquid crystal panel 62a and prompting the USB memory 300 to be detached (step S9), and controls the document reading unit 1 to resume the operation for reading the document (step S10).

In other words, when, after having caused the operation for reading the document to be stopped, the control unit 60 has detected that the USB memory 300 has been detached, the control unit 60 causes the operation for reading the document to be resumed. In this way, after "Yes" has been determined in the step S8, the message prompting the USB memory 300 to be detached has been erased, and the operation for reading the document has been resumed, the operation for reading the document is continued until the document image data of the document of a final page is obtained. When the document image data of the entire document finally read has been saved in the image data memory 61 with being associated with the document ID, the processing illustrated in FIG. 3 is terminated.

On the other hand, in the case of "No" in the above-mentioned step S8, namely, when the USB memory 300 is not detached, the control unit 60 determines whether or not a given period of time (for example, 5 minutes) has elapsed from the stop of the operation for reading the document (step S11). While, in the case of "No" in this step S11, returning to the processing in the step S8, the control unit 60 erases the pieces of data (the document ID, the destination to save image data, and the downloading application) saved in the USB memory 300 and the document image data saved in the image data memory 61, in the case of "Yes" (step S12). In addition, when the document image data is saved in the external storage device such as the server accessible using network communication, the document image data saved in that external storage device is erased.

In this way, when "Yes" has been determined in step S11, namely, when the given period of time has elapsed from the stop of the operation for reading the document without the USB memory 300 being detached, it is highly likely that leaving behind the USB memory 300 has occurred. Therefore, the processing illustrated in FIG. 3 is terminated after the pieces of data saved in the USB memory 300 and the image data memory 61 have been erased so as to secure the confidentiality of information described in the document.

As described above, according to an embodiment, in a case where the control unit 60 has detected that the scanning start key has been held down in a state in which the USB memory 300 has been attached, the control unit 60 controls the document reading unit 1 to start the operation for reading a document, and after having saved the document ID, the destination to save image data, and the downloading application in the attached USB memory 300, the control unit 60 stops the operation for reading a document when the USB memory 300 is not detached during the operation for reading a document. Therefore, in an early stage after the start of the operation for reading a document, it is possible to strongly prompt the user to detach the USB memory 300, and as a result, it becomes possible to prevent the USB memory 300 from being left behind.

Even if the USB memory 300 has been left behind, the pieces of data (the document ID, the destination to save image data, and the downloading application) and the document image data saved in the image data memory 61 are erased. Therefore, the confidentiality of information described in the document is secured.

In addition, if the user has detached and carried the USB memory 300, it is possible to automatically download the document image data associated with the document ID, from the destination to save image data (the image data memory 61 in the multifunction machine 100 in the present embodiment) through the network, just by executing the downloading application saved in the USB memory 300 on the personal computer the user uses. It is also possible to give the USB memory 300 to another user, and it is also possible for this user to download the document image data.

While there is also the risk of eavesdropping in the network, it is possible to encrypt the document image data using an adequate mechanism, and it is possible to restrict the document image data to be downloaded to scanned document image data. Therefore, the use of the network is significantly safe, compared with the case of losing the USB memory 300 that is capable of saving a great deal of other information.

So far, while the multifunction machine 100 according to an embodiment of the present disclosure has been described, the present disclosure is not limited to the above-mentioned embodiment, and the following examples of a modification may also be made.

(1) While, in the above-mentioned embodiment, a case has been exemplified where the document ID, the destination to save image data, and the downloading application are saved in the USB memory 300, it is only necessary for at least the document ID and the destination to save image data to be saved in the USB memory 300. If the user just attaches the detached USB memory 300 to the personal computer, it is possible for the user to access the destination to save the image data through the network based on the document ID and the destination to save image data, saved in the USB memory 300, and acquire the document image data associated with the document ID. In addition, the downloading application may also be preliminarily installed into the personal computer the user uses.

(2) While, in the above-mentioned embodiment, a case has been exemplified where the document image data obtained due to the operation for reading a document, performed by the document reading unit 1, is saved in only the image data memory 61, a function may also be provided in the control unit 60 for saving, in the USB memory 300, the document image data obtained owing to the operation for reading a document or the thumbnail data thereof until the USB memory 300 is detached. Accordingly, it is possible for the user to confirm the content of the read document on the personal computer.

(3) While, in the above-mentioned embodiment, a case has been exemplified where one document ID is associated with the document image data of one written document (one job), when pieces of document image data of a plurality of written documents (a plurality of jobs) have been obtained, separate document IDs may be individually prepared for these.

(4) While, in the above-mentioned embodiment, the USB memory 300 has been exemplified as an attachable and detachable storage medium, another storage medium such as an SD card may also be used. In addition, while, in the above-mentioned embodiment, a case where the image forming apparatus according to the present disclosure is the multifunction machine 100 has been cited as an example and described, the image forming apparatus according to the present disclosure may also be a copying machine, a facsimile machine, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus to which an attachable and detachable storage medium is attachable, the image forming apparatus comprising:
   an operation unit configured to output an operation signal corresponding to an operation of a user;
   a document reading unit configured to read plural sheets of a document sequentially and generate image data of the document; and
   a control unit configured to control the document reading unit to start an operation for reading the document after having received an operation signal for reading the document from the operation unit, and to save identification information of the document and a destination to save image data of the document in the attachable and detachable storage medium, wherein after the identification information of the document and the destination to save image data of the document have been saved in the attachable and detachable storage medium, when reading of a preliminarily defined number of sheets in the document has been completed without the attachable and detachable storage medium being detached during the operation for reading the document, the control unit stops the operation for reading the document.

2. The image forming apparatus according to claim 1, wherein
   when, after having caused the operation for reading the document to be stopped, the control unit has detected that the attachable and detachable storage medium has been detached, the control unit causes the operation for reading the document to resume.

3. The image forming apparatus according to claim 1, wherein
   when, after having caused the operation for reading the document to be stopped, within a predetermined time the control unit has not detected that the attachable and detachable storage medium has been detached, the control unit deletes the identification information of the document and the destination to save the image data of the document, saved in the attachable and detachable storage medium.

4. The image forming apparatus according to claim 1, further comprising:
   a display unit configured to notify the user of various kinds of information; and
   after having saved the identification information of the document and the destination to save the image data of the document in the attachable and detachable storage medium, the control unit causes the display unit to display a message prompting the attachable and detachable storage medium to be detached until the attachable and detachable storage medium is detached.

5. The image forming apparatus according to claim 1, wherein
   in addition to the identification information of the document and the destination to save the image data of the document, the control unit saves, in the attachable and detachable storage medium, application software automatically downloading, from the destination to save the image data of the document, the image data of the document, associated with the identification information, when the application software has been executed.

6. The image forming apparatus according to claim 5, wherein
   when, after having caused the operation for reading the document to be stopped, within a predetermined time the control unit has not detected that the attachable and detachable storage medium has been detached, the control unit deletes the identification information of the document, the destination to save the image data of the document, and the application software, saved in the attachable and detachable storage medium.

7. The image forming apparatus according to claim 1, wherein
   the control unit saves the image data, obtained due to the operation for reading the document, in a storage device within the self-device or an external storage device accessible owing to network communication.

8. The image forming apparatus according to claim 7, wherein
   the destination to save the image data is an address on a network, assigned to the self-device, when the image data, obtained due to the operation for reading the document, is saved in the storage device within the self-device, and the destination to save the image data is an address on a network, assigned to the external storage device, when the image data, obtained due to the operation for reading the document, is saved in the external storage device accessible using the network communication.

9. The image forming apparatus according to claim 7, wherein
   when, after having caused the operation for reading the document to be stopped, within a predetermined time the control unit has not detected that the attachable and detachable storage medium has been detached, the control unit deletes the identification information of the document and the destination to save the image data of the document, saved in the attachable and detachable storage medium, and the image data saved in the storage device or the external storage device.

10. The image forming apparatus according to claim 1, wherein
    the identification information of the document is a unique serial number of the attachable and detachable storage medium.

* * * * *